Feb. 18, 1941.        R. A. SANDBERG        2,232,562
METHOD OF MAKING A HEAT EXCHANGER
Filed Oct. 21, 1937
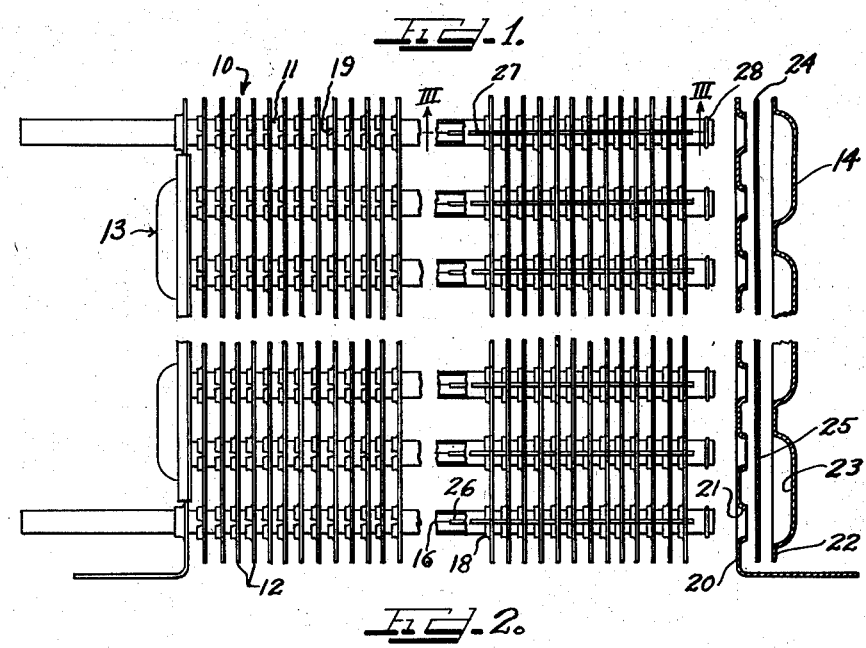
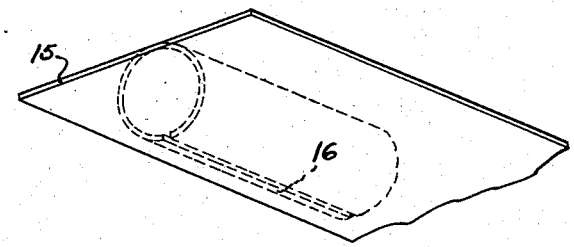
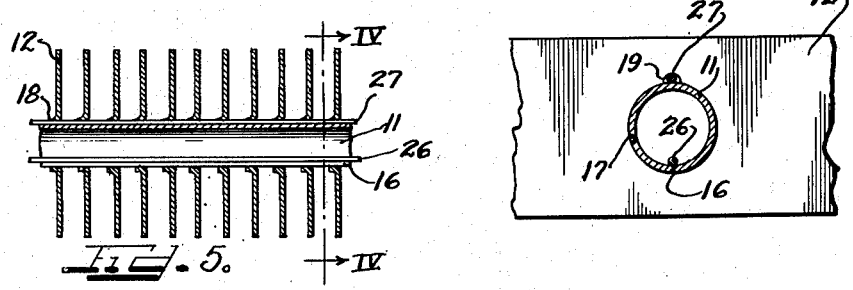
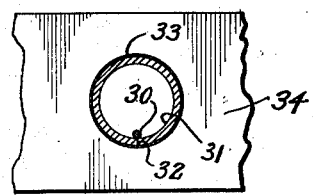
Inventor
Ray A. Sandberg.

Patented Feb. 18, 1941

2,232,562

UNITED STATES PATENT OFFICE 2,232,562

METHOD OF MAKING A HEAT EXCHANGER

Ray A. Sandberg, Waukegan, Ill., assignor, by mesne assignments, to Houdaille-Hershey Corporation, Detroit, Mich., a corporation of Michigan Application October 21, 1937, Serial No. 170,181

1 Claim. (Cl. 113—118)

This invention relates to a method of making a heat exchanger, and more particularly to a method of making a condenser for use with electrical refrigerators.

The subject matter of the present invention is disclosed in my issued Patent No. 2,064,036, dated December 15, 1936, but the specific method described and claimed herein is not claimed in that patent. In accordance with the present method, the condenser tubes are formed from sheet metal into open seamed tubes, which are then assembled within transverse fins and the headers and fins assembled on the tubes by means of a brazing operation, using a brazing wire, rod or the like, placed within the tubes for effecting the brazing of the seams of the tubes and of the tubes to the fins. Other brazing material may also be used to insure simultaneous brazing of the fins to the tubes and of the elements of the headers to each other and to the tube ends.

It is therefore an object of this invention to provide a method for the manufacture of heat exchangers, condensers and the like, wherein the various parts and elements are first assembled with brazing material placed within the open seamed tubes and elsewhere as necessary, and the whole assembly brazed in a single operation.

Other and further important objects of this invention will become apparent from the disclosure in the following specification and the accompanying drawing.

The accompanying drawing illustrates a heat exchanger manufactured in accordance with the method of the present invention and the views thereof are as follows:

Figure 1 is a top plan, composite view, illustrating, at the left hand side, the finished condenser and, at the right hand side, the condenser in process of assembly, with parts broken away and in section.

Figure 2 is a fragmentary isometric view of a metal sheet from which a tube is rolled, showing in dotted lines the manner of rolling the sheet to form a tube with the abutting edges forming an open seam lengthwise of the tube.

Figure 3 is a fragmentary sectional view taken substantially along the line III—III of Fig. 1.

Figure 4 is an enlarged fragmentary sectional view taken substantialy along the line IV—IV of Fig. 3.

Figure 5 is a fragmentary sectional view of a modification of my invention.

The reference numeral 10 indicates generally a heat exchanger embodying the principles of this invention and comprising a plurality of parallel tubes 11, on which are mounted transversely extending sheet metal fins 12. Headers 13 and 14 receive the respective ends of the tubes 11 and connect pairs of said tubes to provide for a circuitous flow of the cooling or heating fluid through the heat exchanger.

In accordance with the method of this invention, each of the tubes 11 is formed from a strip 15 (Fig. 2) of sheets metal, such as steel, by rolling the strip into the form of an elongated cylinder, or tube, having an open seam 16 extending longitudinally thereof. The fins 12 are also formed, preferably, of relatively thin sheet metal, such as iron or steel, and are provided with apertures 17 adapted to snugly receive the tubes 11. Struck out flanges 18 surround the apertures 16 and embrace the tubes 11. Preferably, in the formation of the flanges 18, notches 19 are provided all on one side, or on opposite sides of the apertures 17. The formation of the apertures 17 and notched flanges 18 can suitably be performed in a stamping operation.

The headers 13 and 14 are similarly formed, so that a description of the header 14 will be sufficient. Said header 14 comprises an inner sheet metal plate 20 having flanged apertures 21 for receiving the ends of the tubes 11. The flanges 21 may project either outwardly, as shown, or inwardly, and are of such diameter as to snugly receive the ends of said tubes 11. An outer plate 22 completes the header 14. Said outer plate 22 is provided with outwardly convex embossed portions 23 of such dimension as to embrace two adjacent flanged openings 21 of the inner plate 20, thereby connecting the corresponding tubes 11. In the assembling of the header plates 20 and 22, a thin brazing shim 24 is inserted between said plates 20 and 22 to lie between and abut the plane corresponding surfaces of said plates. Said brazing shim 24 is provided with apertures 25 of substantially the same size and configuration as the openings into the embossed portions 23.

When assembling the parts of the heat exchanger, or condenser, the fins 12 are first inserted in a form, holder or jig, as shown and described in my Patent No. 2,064,036, with the flanges 18 extending in the same direction and with the notches 19 all in alignment. The tubes 11 are then inserted through the flanged apertures 17 of said fins 11, with the longitudinal seams 16 extending along the bottoms of said tubes. Brazing wires 26 are laid within said tubes 11 along the seams 16. Other brazing wires 27 are preferably inserted through the notches 19 to lie along the top surfaces of the tubes 11. Said brazing wires 16 and 27, like the brazing shim 24, may be of brass, or other copper containing metal or alloy. Single turns of brazing wires 28 may likewise be inserted over the ends of the tubes 11 prior to assembling the inner header plate 20 upon said ends.

After the parts have been assembled, as indicated, the assembly is introduced into a furnace, which may suitably be an electric furnace having a non-oxidizing, or reducing atmosphere, as for instance an atmosphere of hydrogen, or a mixture of hydrogen with illuminating gas, or the like. The temperature within the furnace is maintained at a point sufficiently high to cause the brazing material of the wires 26, 27 and 28, and of the shims 24, to melt and effect the brazing of the parts together. Temperatures of 1800 to 2000° F. may be used, and slightly higher temperatures if copper is employed.

Due to capillary action, the molten brazing metal formed by melting down the wires 26, 27 and 28, and the shims 24, flows into all of the joints formed between the several parts of the unit and effects a complete bonding at said joints. The wires 16 on the insides of the tubes 11, for instance, melt down and the metal thereof flows into the seams 16 and even through said seams and around the outside of the tubes 11 to effect the bonding of the fins 12 to said tubes 11. The brazing metal of the wires 26 thus effects the closing of the open seams 16 and the excess metal assists in the brazing of the tubes 11 on the outside to the flanges 18. The metal of the brazing wires 27 insures a complete bonding of the flanges 18 to the outsides of the tubes 11. The inner and outer plates 20 and 22, respectively, of the headers are bonded together by means of the metal provided by the shims 24, and said headers are bonded to the ends of the tubes 11 by means of the brazing material supplied by the wires 28.

In Fig. 5, which shows a slight modification of my invention, a wire 30 is laid inside each of the tubes 31 along the seam 32. Each tube, however, is provided on its outer surface with a plating layer 33 of copper, brass or other copper-containing brazing material, which serves in lieu of an external brazing wire to complete the brazing of the tube to the fin 34. The fin 34 is apertured as at 35 to snugly receive the tube 31, but no notches, similar to the notches 19 need be provided. The heat exchanger, after assembly of the various parts, is brazed in a single operation such as above described.

In this manner, excellent thermal joints are formed between the various connecting surfaces of the tubes, fins, and header walls and the various elements of the heat exchanger are firmly and rigidly united into an integral whole. The use of steel for the tubes and fins, although having a lower rate of heat transfer than copper, is nevertheless justified by the lower cost of steel and the ease with which good thermal joints can be produced by the method described.

It will thus be apparent that the entire brazing operation is carried out automatically and in a single step, thereby eliminating the necessity for manually performing separate brazing operations. The brazing of the condenser in the manner described causes a simultaneous closing of the seams of the tubes 11 and a brazing of the fins 12 to said tubes 11, as well as a brazing of the header plates to each other and to the ends of the tubes.

Since the header plates and fins are formed by a simple stamping operation, they can be made in large quantities at very little expense by practically automatic machinery. It is also a relatively simple and inexpensive operation to form the tubes 11 from sheet metal, as compared with the manufacture of seamless tubing. In assembling the fins over the tubes, the edges of the seams of said tubes are brought into closely abutting relation, such that the brazing operation effects a fluid tight joint.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

The method of constructing a heat exchanger which comprises assembling apertured fins across open seamed tubes having an external layer of brazing material, providing brazing material within said tubes, inserting each set of adjacent ends of said tubes into a sheet metal plate having flanged apertures adapted to snugly receive said ends, superposing on each of said sheet metal plates a brazing shim having apertures adapted to register with the apertures of said sheet metal plates, superposing on each of said brazing shims an outer sheet metal plate provided with a plurality of outwardly convex embossed portions each adapted to embrace two of the flanged apertures of said sheet metal plates, and heating the assembly to cause the brazing material disposed within said tubes to flow out at the seams therein, and, together with said external layers of brazing material and said brazing shims, to braze said tubes, fins and sheet metal plates together.

RAY A. SANDBERG.